Nov. 20, 1951

G. E. MULLINIX 2,575,356

PIPE SLIP ACTUATOR

Filed April 9, 1946

INVENTOR.
GIRD E. MULLINIX,
BY
Lyon & Lyon
ATTORNEYS.

Nov. 20, 1951

G. E. MULLINIX 2,575,356

PIPE SLIP ACTUATOR

Filed April 9, 1946

INVENTOR.
GIRD E. MULLINIX,
BY
ATTORNEYS.

Nov. 20, 1951   G. E. MULLINIX   2,575,356
PIPE SLIP ACTUATOR
Filed April 9, 1946   6 Sheets-Sheet 6
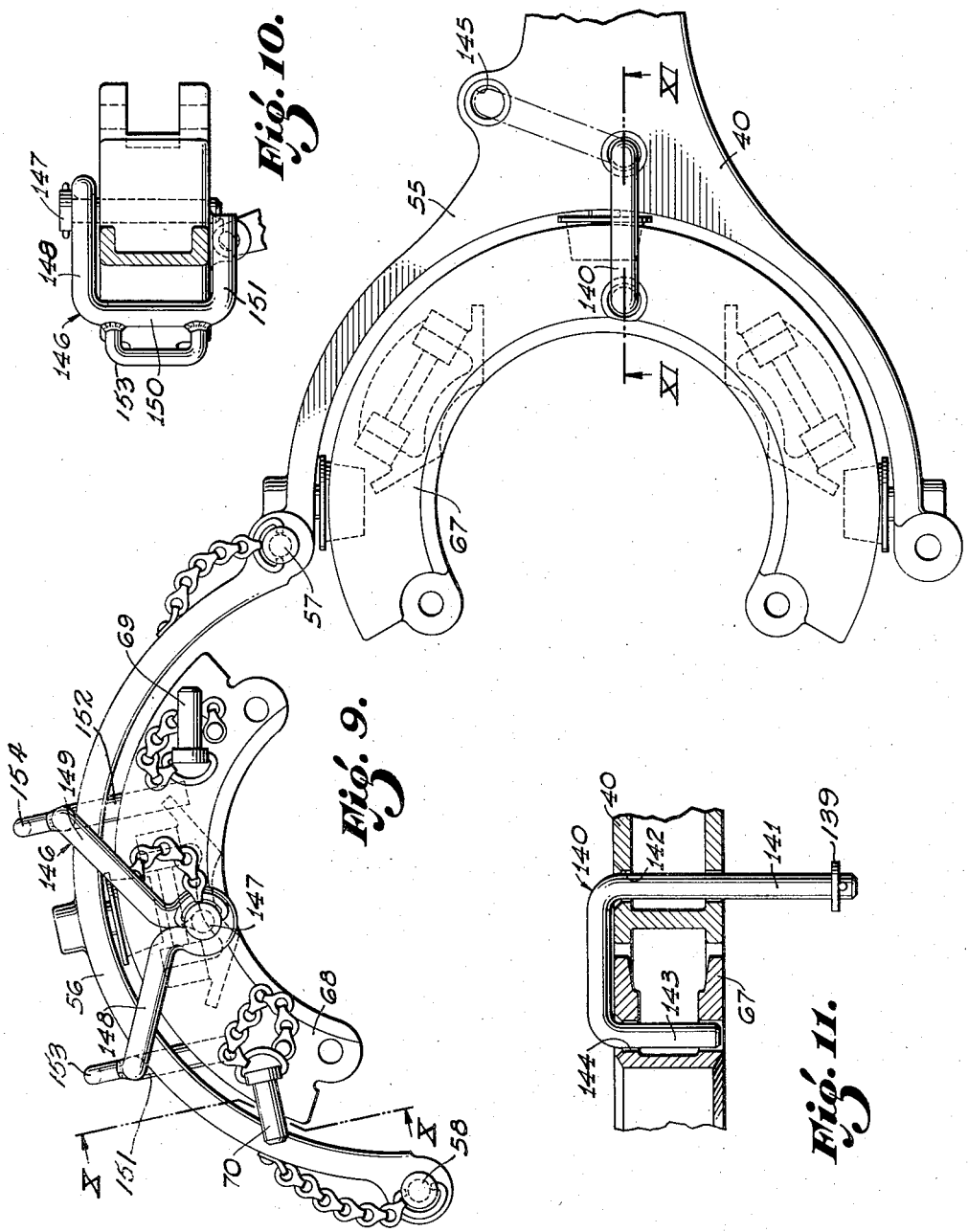
INVENTOR.
GIRD E. MULLINIX,
BY
ATTORNEYS.

Patented Nov. 20, 1951

2,575,356

UNITED STATES PATENT OFFICE 2,575,356

PIPE SLIP ACTUATOR

Gird E. Mullinix, South Gate, Calif., assignor to Byron Jackson Co., Vernon, Calif., a corporation of Delaware Application April 9, 1946, Serial No. 660,679

10 Claims. (Cl. 24—263)

This invention relates to power-operated actuating means for slips such as are used for supporting oil well drill pipe and casing.

In the process of drilling and completing oil wells it is customary to support the drill pipe in the rotary table while making up the threaded joints between the pipe sections. The pipe is supported by tapered wedge slips seated in a tapered opening in the master bushing supported in the rotary table, the slips usually being inserted and removed manually. Because of the weight of the slips, the services of two men are required for this operation, which is not only arduous but also hazardous. When drilling below ten thousand feet, which is now common, the number of sections or stands into which the drill string is broken down when it is removed from the well, is well in excess of one hundred. The slips must be inserted and removed each time a section is broken out or made up, and this repeated handling of the slips induces fatigue in the men handling the slips, which not only slows down the operation but also renders them less alert to danger.

Various means have heretofore been proposed for moving the slips to and from operating position, but such means have not proved to be practical for various reasons, such as insufficient range of movement of the slips to accommodate a wide range of pipe sizes, lack of dependability under all operating conditions, cumbersomeness of the equipment, interference with other operations, such as tonging the joints, and other practical drawbacks.

One of the principal objects of this invention is to provide power-operated slip actuating means which is simple and dependable, which may be disposed in an out-of-the-way position when not in use, and which may be quickly and easily moved into operating position.

It is a further object of this invention to provide a device of the aforesaid type which may be used with a wide range of sizes of pipe slips, to support pipe of a size up to the maximum which can be supported in a standard master bushing.

A still further object of this invention is to provide a pipe slip operating mechanism which is independent of the construction of the rotary table and hence is adaptable to use with any make or size of table.

It occasionally happens that the derrick crown block is not vertically aligned with the opening in the rotary table, thus causing the suspended drill string to hang slightly off-center with respect to the table opening. In this event, when setting the slips the pipe must be forced laterally into central position.

A still further object of this invention is to provide a pipe slip operating mechanism which is positively acting in both slip-releasing and slip-setting directions. By providing means for forcing the slips downwardly toward their seats, the pipe is centered in the table opening without the necessity of relying on the drag of the pipe on the slips to pull the latter downwardly and center the pipe in that way. The exertion of a positive downward force on the slips also enhances their gripping action, especially when only a short length of pipe is being supported.

A still further object is to provide an automatic safety latch which is normally inoperative but which becomes operative to prevent premature setting of the slips in the event the supply of actuating fluid is inadvertently cut off or its pressure drops below a predetermined value while the slips are in raised position.

A still further object is to provide a power-operated slip actuating device which incorporates a safety releasing connection between elements thereof, which prevents damage to the mechanism in the event the pipe elevator is lowered too far and engages the slip supporting element, and, also, in the event the drill string is inadvertently raised by the hoisting mechanism while the slip-actuating mechanism is locked in slip-setting position.

A still further object is to provide a power-operated slip actuating device in which the slips are supported by a continuous annular ring which in turn is rotatably supported by a second continuous ring, and in which both rings include a pivoted or detachable segment to permit their being applied to and removed laterally from the pipe. In this manner, the device may be moved into operating position around the pipe or removed therefrom while the pipe is suspended by the hoisting mechanism. Otherwise it would be necessary to temporarily support the pipe in the rotary table by other slips and break a joint and then lower the rings over the upper end of the pipe.

A still further object is to provide means for temporarily securing the segments of the slip carrier ring to the corresponding sections of the supporting ring when the rings are opened up to enable them to be applied to or removed laterally from the pipe.

A still further object of this invention is to provide simple and effective means whereby the slips may be quickly and easily detached from their supporting ring, thus facilitating the substitution of different sized slips when running a pipe string made up of different sizes of pipe, subs and drill collars.

Other objects and advantages of the invention will be apparent from the following detailed description of one embodiment of the invention, reference being made to the accompanying drawings wherein:

Fig. 9 is a top plan view of the slip-supporting arm and carrier ring in open position, with the carrier ring segments temporarily secured to the arm and gate;

Fig. 10 is a view taken on line X—X of Fig. 9; and

Fig. 11 is a vertical sectional view taken on line XI—XI of Fig. 9.

Figure 1:
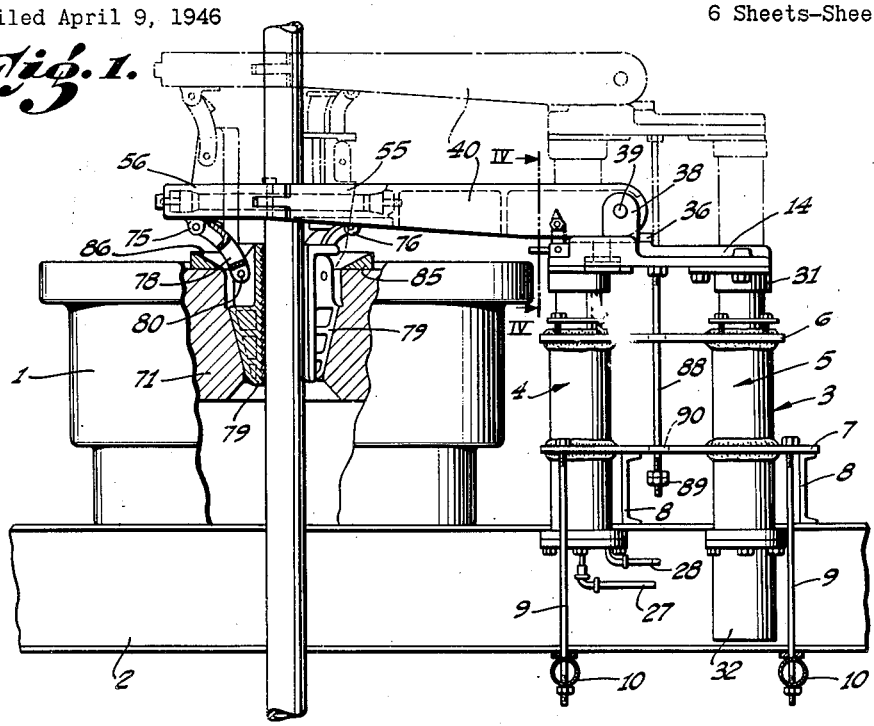
Fig. 1 is a view in side elevation of the device in operating position with parts cut away to show the slips in set position.

Referring to the drawings, reference numeral 1 denotes a rotary table supported on the usual I-beams 2 forming part of the sub-base of the derrick structure. A cylinder assembly, generally designated 3, is rigidly supported in predetermined relation to the rotary table in any suitable manner. In the present instance it is clamped to the I-beams 2.

Figure 3:
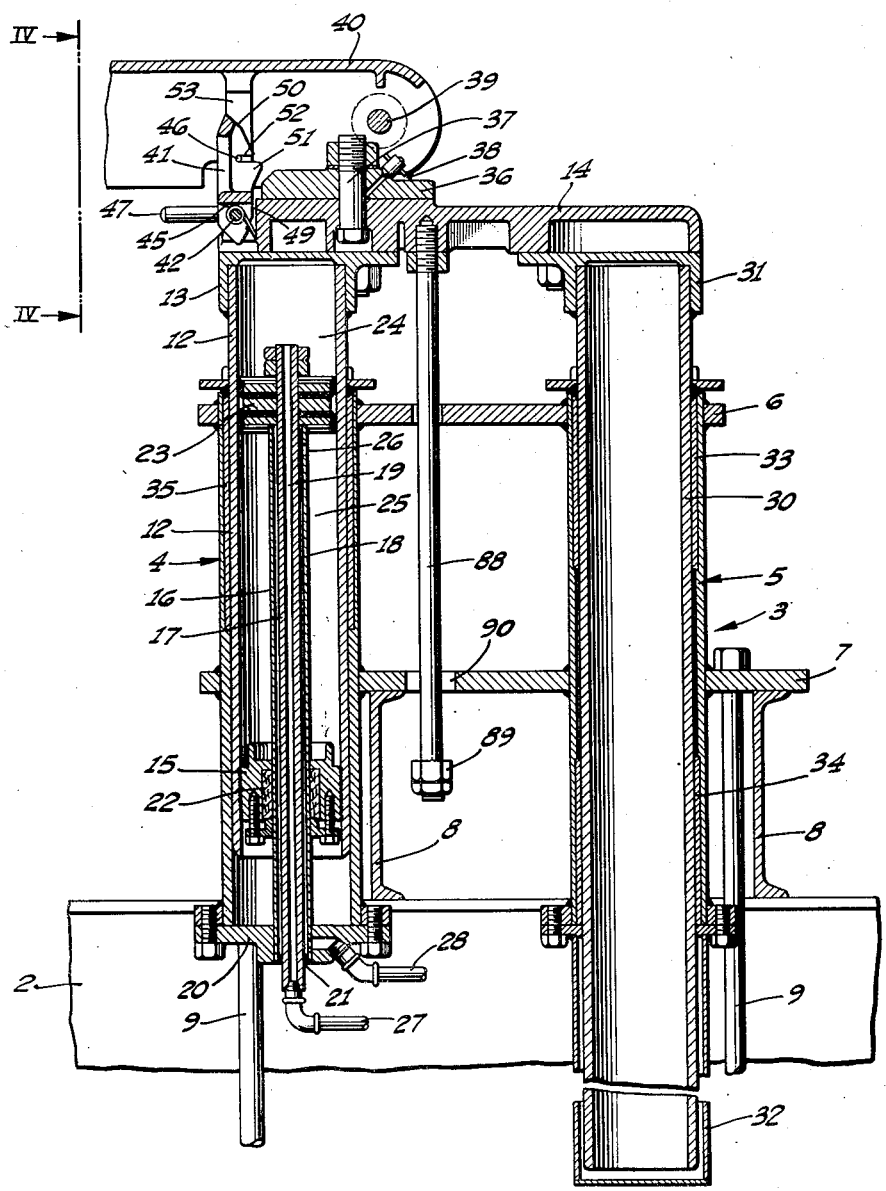
Fig. 3 is a vertical sectional view taken on the line III—III of Fig. 2.

Referring particularly to Figs. 1 and 3, it will be observed that the cylinder assembly 3 comprises generally a power cylinder 4 and a guide cylinder 5, rigidly connected together by vertically spaced plates 6 and 7. The lower plate 7 is supported on a pair of channel beams 8, 8 bridging the space between the I-beams 2 and supported thereon. The cylinder assembly is clamped to the I-beams by clamp bolts 9, herein four in number, extending between the plate 7 and a pair of transversely extending sections of pipe 10 engaging the underside of the I-beams 2. It will be understood that the derrick floor is built up around the rotary table and the cylinder assembly, but this has been omitted from the drawing in order to illustrate more clearly the cylinder assembly mounting.

The power cylinder 4 is of the double-acting plunger type and includes a plunger 12 projecting through the upper end of the cylinder and slidable therein. The upper end of the plunger is closed by a head 13 to which is attached a swivel base 14, to be hereinafter described. The lower end of the plunger is closed by a head 15 threadably connected thereto. Mounted concentrically within the cylinder and plunger is a tubular member 16 within which extends a second tubular member 17 spaced inwardly therefrom to provide an annular fluid passage 18 between the members. The inner tubular member 17 also provides a central fluid passage 19. The outer member 16 is rigidly secured at its lower end to a cylinder head 20 and is thus held stationary with respect to the cylinder. The inner member 17 is secured at its lower end to the outer member 16, as by welding at 21 which also serves to close the lower end of the annular fluid passage 18. The members 16 and 17 extend through the lower plunger head 15, which is provided with suitable packing 22 forming a fluid-tight sliding joint with the outer wall of the member 16. A piston 23 is secured to the upper extremities of the members 16 and 17 and engages the inner wall of the plunger 12 to divide the interior thereof into upper and lower compartments 24 and 25 into which actuating fluid is alternately admitted to move the plunger upwardly or downwardly.

It will be observed that the inner tubular member 17 extends through the piston 23, thus communicating the fluid passage 19 with the compartment 24. One or more lateral ports 26 are provided in the wall of the outer tubular member 16 immediately below the piston 23 thus communicating the annular fluid passage 18 with the compartment 25. A conduit 27 is connected to the lower extremity of the inner tubular member, and a conduit 28 is connected to the cylinder head 20 and communicates with the annular passage 18. The conduits 27 and 28 are connected at their other ends to a four-way reversing valve, not shown but preferably located adjacent the driller's position, whereby the driller may selectively admit pressure fluid from a suitable source to either the upper compartment 24 or the lower compartment 25 of the plunger 12, and thus raise or lower the plunger. The reversing valve is, of course, arranged so that when pressure fluid is admitted to one of the compartments the other compartment is exhausted.

The guide cylinder 5 slidably receives a sleeve 30 to the upper extremity of which is secured a head 31 similar to the head 13 and also attached to the swivel base 14. The guide cylinder and sleeve serve merely to relieve the plunger 12 and its cylinder 4 of lateral stresses which would be otherwise imposed thereon by the overhanging weight of the slip assembly (Fig. 1). The sleeve 30 extends downwardly a substantial distance below the lower end of the cylinder 5 when in its lowermost position, so that when it is raised to its uppermost position it will extend substantially throughout the entire length of the cylinder 5 and thus obtain the maximum guiding effect. The downwardly projecting lower end of the sleeve 30 is enclosed within a housing 32 depending from the cylinder 5. The housing may, if desired, be filled with lubricant into which the sleeve will dip each time it is lowered. It is considered preferable, but not essential, that bearing bushings of bronze or the like be provided in the guide cylinder 5, as at 33 and 34. A similar bushing 35 may be provided also in the power cylinder 4.

Figure 4:
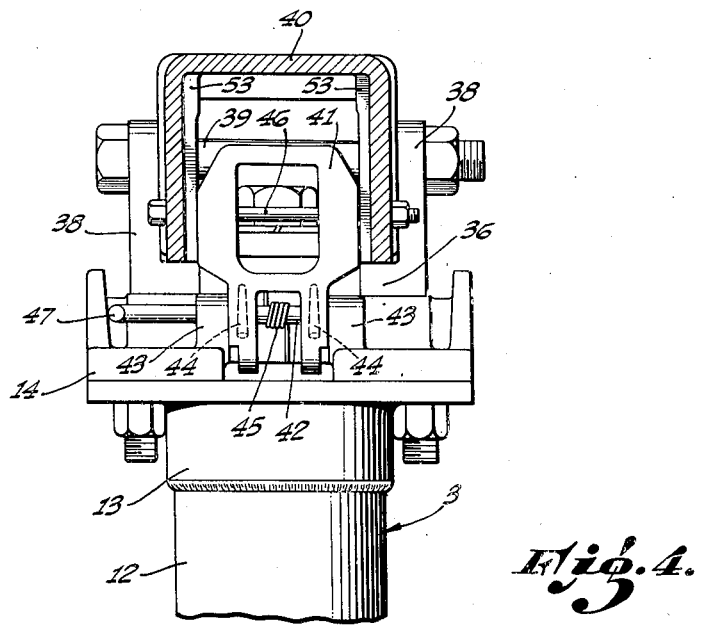
Fig. 4 is a sectional view taken on the line IV—IV of Figs. 1 and 3.

Adjacent the inner end of the swivel base 14 a swivel plate 36 is mounted thereon for horizontal swiveling about the axis of an upright pivot bolt 37. The swivel plate is provided with a pair of upstanding ears 38, 38 which receive a transverse pivot pin 39 for pivotally supporting a slip-supporting arm 40 extending inwardly over the rotary table. As shown in Fig. 4, the arm 40 is of inverted U-shape in cross-section, and is normally latched against both horizontal swiveling and vertical pivotal movement by a latch 41 pivotally mounted on the swivel base 14. As shown in Figs. 3 and 4, the latch is pivotally mounted on a transverse pin 42 journaled in ears 43, 43 formed on the swivel base 14, and is keyed to the pin 42 as by tapered pins 44, 44. A torsion spring 45 normally urges the latch into its upright position wherein it engages a transverse latch pin 43 extending between the side walls of the arm 40. The latch pin 46 is purposely made relatively small and of insufficient strength to withstand a severe strain or blow, so that in the event the arm 40 is inadvertently subjected to an excessive strain in either upward or downward direction, the latch pin will shear and allow the arm to pivot upwardly or downwardly relative to the swivel base.

The provision of the swivel plate 36 and latch 41 renders it possible to move the arm, and the slip assembly supported thereby, into an inoperative position clear of the table when not in use, such as during drilling. The latch pivot pin 42 is provided with an integral handle portion 47 at one end thereof, to permit manual manipulation of the latch out of engagement with the latch pin 46. With the latch released, eyes 48, 48 on the arm (Fig. 2) may be engaged by the usual catline and the arm raised upwardly about the pivot pin 39 until it clears the upper end of the latch 41, whereupon the arm and swivel plate 36 may be rotated about the upright swivel bolt 37 into any desired inoperative position. When returning the arm to its operative position it is unnecessary to manually retract the latch, in view of the provision of a stop 49 on the latch which, in conjunction with the torsion spring 45, normally retains the latch in a position wherein its beveled nose portion 50 is engaged by the latch pin 46 as the arm descends, thus camming the latch open. After riding downwardly along the beveled face of the latch, the latch pin engages a projecting ledge 51 on the latch, thus limiting the downward movement of the arm and allowing the latch pin to enter the slot 52 in the latch as the latch returns to upright position under the influence of the spring 45. Although the latch has been referred to above as provided with only a single nose portion 50, ledge 51 and slot 52, it will be seen from Fig. 4 that these parts are duplicated at opposite sides of the latch, the slotted portion having close clearance with a pair of internal ribs 53, 53 formed on the inner wall of the arm 40. In this manner the latch pin is subjected to pure shear stress at the two planes at the opposite sides of the latch, rather than to bending stress. An excessive strain will therefore shear the pin cleanly, making it easy to replace it.

Figure 5:
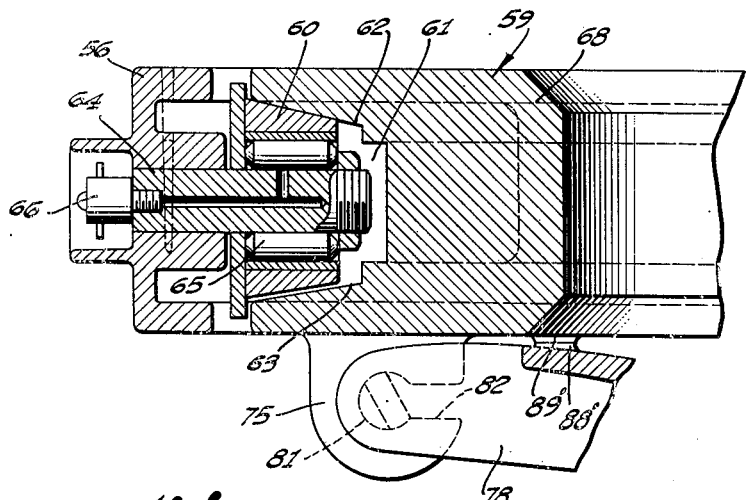
Fig. 5 is a sectional view taken on the line V—V of Fig. 2.

Referring again to Figs. 1, 2 and 5, it will be observed that the arm 40 is forked at its inner end to form a semicircular ring 55. A cooperating semi-circular ring 56 is pivotally connected at 57 to the ring 55 and is releasably connected thereto at a diametrically opposite point, as by a retractable pin 58. The rings 55 and 56 cooperate to provide a circular recess in which is rotatably supported a slip-carrier ring generally designated 59. As shown most clearly in Figs. 2 and 5, rollers 60 are mounted at spaced intervals on the rings 55 and 56 and engage a recess 61 in the outer periphery of the carrier ring 59 for rotatably supporting the latter and confining it against either upward or downward movement relative to the rings 55 and 56. Referring particularly to Fig. 5, it will be observed that the recess 61 is defined by upper and lower frustoconical trackways 62 and 63 which are selectively engaged by the rollers 60. Each roller is journaled on a pin 64 secured in the ring 55 or 56, by a roller bearing 65 which may be lubricated at intervals through a fitting 66.

The slip-carrier ring 59 comprises two segments 67 and 68, detachably connected together at 69 and 70. The ring segment 67 embraces an arc of approximately 240° and supports two slips of a three-slip assembly, while the segment 68 supports the third slip. The internal diameter of the carrier ring is at least as large as the opening through the master bushing 71 in the rotary table, and the slips are suspended from the carrier ring in such a manner that as the ring is lifted the slips move radially outwardly into positions wherein they are disposed entirely outside the opening through the ring and the master bushing. It is, therefore, impossible for any projections on the drill pipe, such as tool joints and casing protectors, to drag on the slips as the pipe is raised or lowered.

Figure 2:
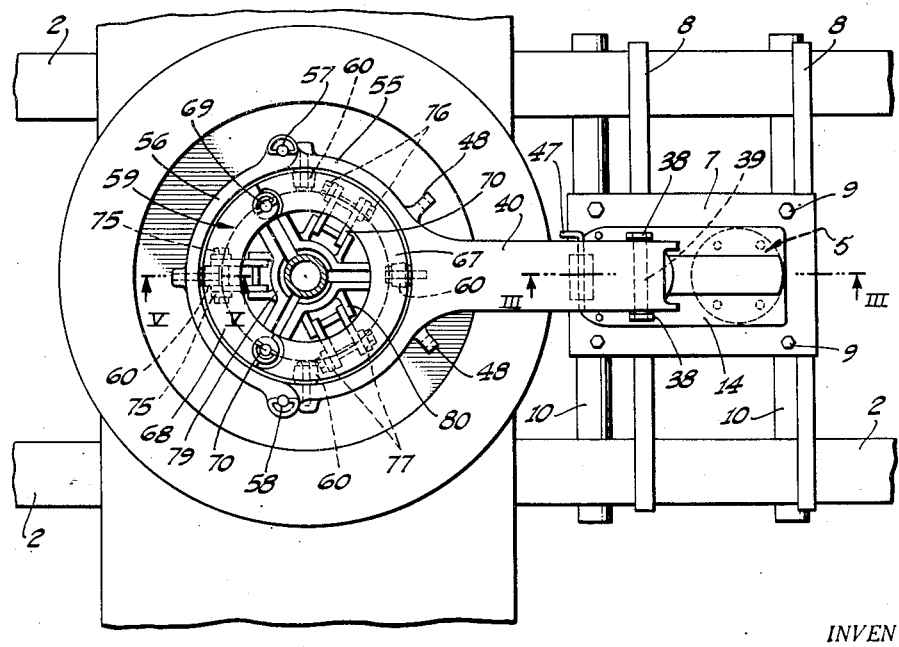
Fig. 2 is a top plan view of the device of Fig. 1.

As shown in Fig. 2, three pairs of pivot lugs 75, 75, 76, 76 and 77, 77 project downwardly from the lower surface of the carrier ring segments 67 and 68, each pair of lugs forming a pivotal supporting connection for a slip rein 78. A slip 79 is pivotally connected to the lower end of each rein on a horizontal pivot at 80 (Fig. 1). The slips may be of conventional design, except for the pivotal connection to the reins, and hence further detailed description thereof is deemed unnecessary. The pivotal connection between the upper ends of the reins and the carrier ring is of the quick-detachable type, and consists of a short pivot pin 81 (Fig. 5) projecting outwardly from each side member of the rein and integral therewith. The pins 81 are flattened on two opposite sides for insertion into the bores in the pivot lugs 75 through slots 82 in the latter, when the reins are swung into a predetermined position. When it is desired to replace the slips 79 with slips of a different size, the reins are swung in a clockwise direction, as viewed in Fig. 5, approximately 120° from the position shown in that figure, thus aligning the flattened sides of the pivot pins 81 with the slots 82 in the pivot lugs 75. The reins may then be detached from the carrier ring by moving the reins bodily inwardly toward the axis of the ring and removing the pivot pins from the lugs through the slots 82. Another set of slips, with substantially identical reins 79 attached thereto may then be attached to the ring by reversing the foregoing steps. The foregoing arrangement eliminates the use of detachable parts such as separate bolts and nuts or the like which might work loose while the device is in use, and it also possesses the advantage of avoiding loss of time in removing separate pivot bolts and their securing means.

In order to enable the slips to be retracted laterally a sufficient distance to clear any size pipe or projection thereon which can pass through a standard master bushing, the slips must be raised completely above the top of the master bushing. A standard master bushing is provided with a flat upper surface, and hence it is necessary to provide means for guiding the lower ends of the slips inwardly during the initial lowering movement, in order to prevent their hanging up on the flat upper surface of the master bushing. For this purpose a two-piece guide plate 85 (Fig. 1) is positioned on the master bushing and properly centered by the Kelly bushing square in the master bushing. The upper surface of the guide plate is tapered downwardly and inwardly at a small angle of the order of 30°, as indicated at 86, to provide a sloping surface down which the lower ends of the slips will ride as the carrier ring is initially lowered. An adjustable stop is provided for adjustably limiting the upward movement of the base 14, in this instance a rod 88 being secured to the base 14 and extending downwardly through aligned openings in the plates 6 and 7, and having an adjustable stop nut 89 on its lower end. The opening 90 in the lower plate 7 is large enough to permit the nut 89 to pass through it and engage the plate 6 to limit upward travel of the base 14, arm 40 and slips.

The mode of operation of the device will be apparent from the foregoing description. When not in use, such as while drilling, the arm 40, with the carrier ring 59 and slips supported thereby, extends in the opposite direction from that shown in Figs. 1 and 2. When the drilling bit becomes dull and it becomes necessary to withdraw the drill string from the well to replace the worn bit, the drill string is raised until the first joint of drill pipe is above the rotary table. The power cylinder 4 is first actuated to raise the base 14 and the arm 40 to their uppermost position. The catline is then connected to the arm 40 by the eyes 48 and the arm is pivoted upwardly about the transverse pivot 39. With the pivoted sections 56 and 68 of the arm 40 and the carrier ring swung into open position, the arm is swung horizontally about the upright pivot 37 (Fig. 3) into operating position over the rotary table. The arm is then lowered to a horizontal position, in which position it is latched by the latch 41. The pivoted ring segments 56 and 68 are then closed and locked by their respective pins 58, 69 and 70. The device then assumes the position indicated in dotted lines in Fig. 1, with the lower ends of the slips engaging the sloping surface 86 on the guide plate 85. Upon actuation of the reversing valve by the driller, pressure fluid is admitted through the conduit 28, annular passage 18 and port 26 to the lower plunger compartment 25, thus positively forcing the plunger 12 downwardly and setting the slips in the tapered bowl in the master bushing. The compartment 24 is simultaneously exhausted through the central fluid passage 19 and the conduit 27.

After breaking the joint between the kelly and the stand of pipe gripped by the slips, and setting the kelly aside, the elevator is latched about the upper end of the pipe and the drill string is raised. With a long string of pipe supported by the slips, the weight of the pipe will hold the slips set even though the reversing valve be actuated to lifting position, hence this may be done before the pipe is raised. In that event, raising the pipe by the hoisting mechanism allows the hydraulic actuator to automatically raise the arm 40 and the slips as soon as the weight of the pipe is removed from the slips. Upward movement of the plunger 12 is effected by admitting pressure fluid through conduit 27 and passage 19 to the upper plunger compartment 24, the lower compartment 25 being exhausted through passage 18 and conduit 28.

It should be noted that the pivotal connection 80 between the slips and the reins 78 is located above and offset slightly inwardly of the center of mass of the slips, so that as the slips are raised out of the master bushing and move upwardly and outwardly along the tapered surface 86 of the guide plate 85, they are maintained in upright position, as indicated in dotted lines in Fig. 1. It will further be noted with reference to Fig. 5 that cooperating abutments 88' and 89' are provided on the reins 78 and the carrier ring 59, respectively, which engage each other when the slips are moved inwardly into engagement with the pipe. The downward force exerted by the power cylinder and plunger is thus transmitted from the carrier ring to the reins through these abutments 88' and 89' when the slips are set, thereby relieving the strain on the pivot lugs 75 and pivot pins 81.

It is customary, when breaking the joints between drill pipe sections, to first loosen the joint by the use of tongs and then complete the unscrewing of the joint by rotating the table and the drill string supported thereby while holding the upper stand of pipe against rotation. It is because of this practice that it is necessary to rotatably mount the carrier ring 59 in the supporting ring 55, 56. The rollers 60 enable the carrier ring to rotate freely with the pipe and slips while the arm 40 and supporting ring exert downward pressure on the carrier ring and slips. The anti-friction mounting also facilitates manual rotation of the carrier ring into proper position for opening the pivoted section 68 prior to moving the device into inoperative position.

Figure 6:
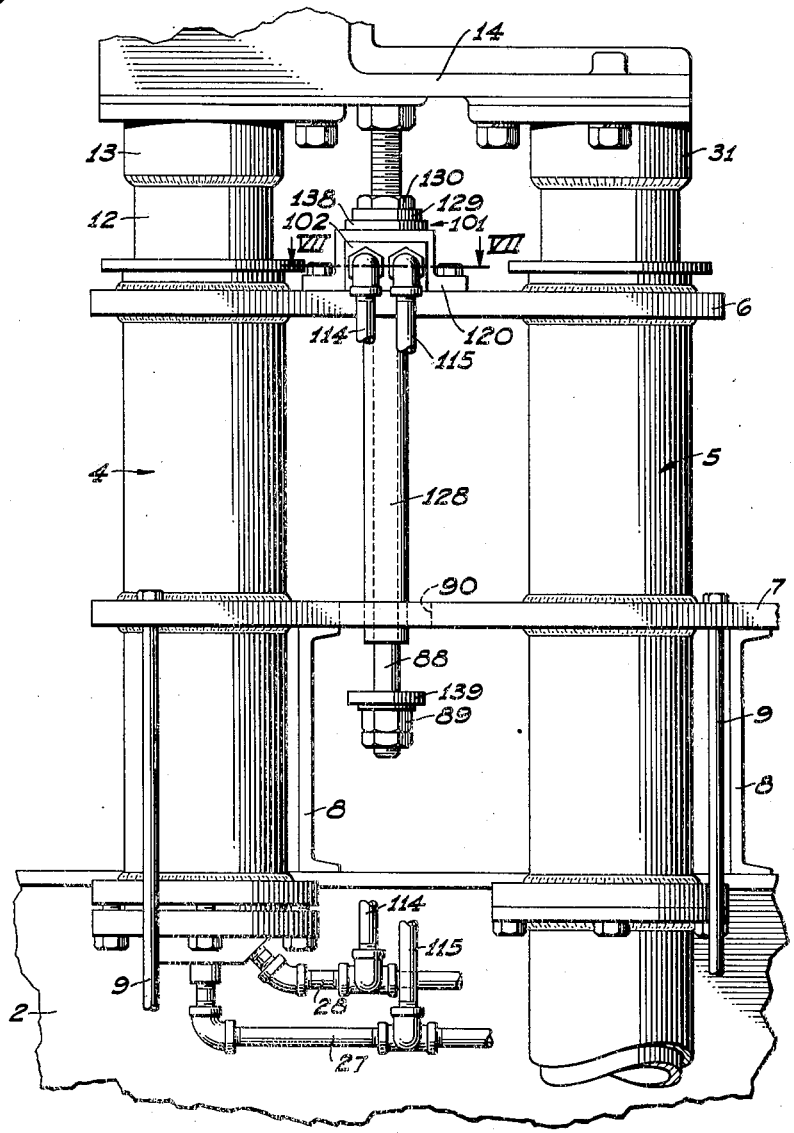
Fig. 6 is a view in side elevation of a modified cylinder assembly incorporating an automatic safety latch.
Figure 7:
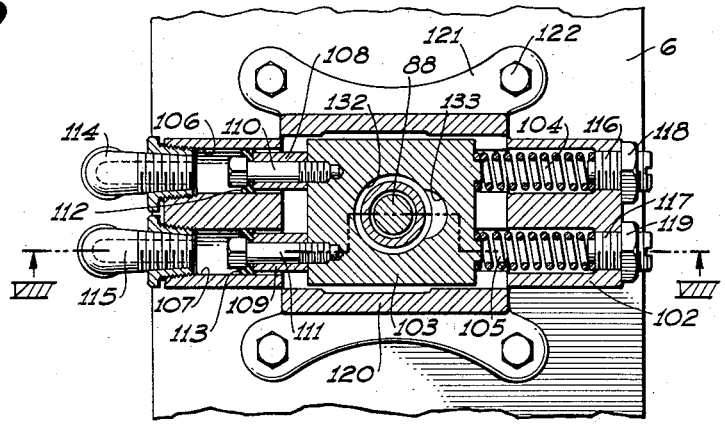
Fig. 7 is a horizontal sectional view taken on line VII—VII of Fig. 6.
Figure 8:
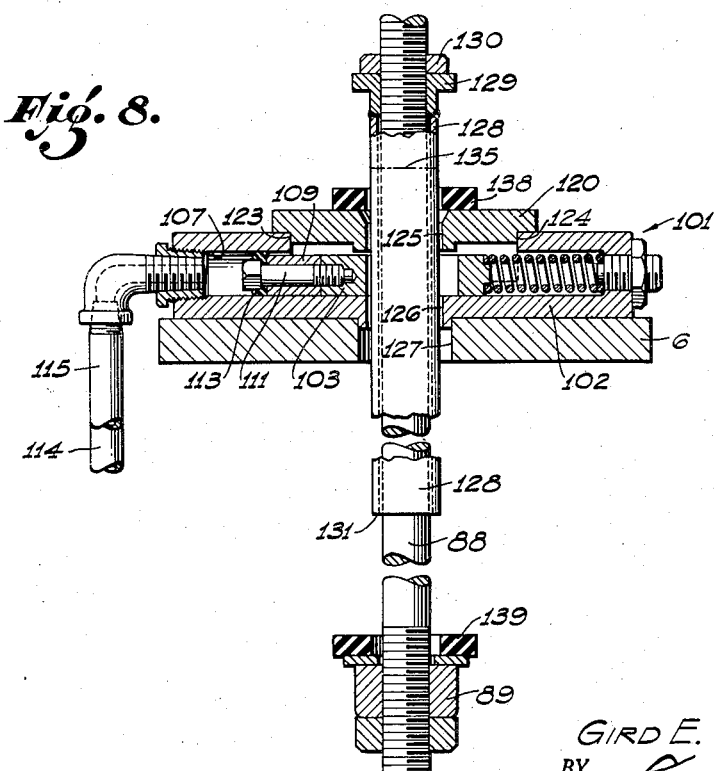
Fig. 8 is a vertical sectional view taken on line VIII—VIII of Fig. 7.

In Figs. 6, 7 and 8 there is shown a slightly modified form of the cylinder assembly, which has incorporated therein an automatic safety latch, generally designated 101. Referring particularly to Figs. 7 and 8, a body member 102 is mounted on the upper surface of the upper plate 6 extending between the cylinders 4 and 5. The interior of the body member provides a rectangular recess in which a latch member 103 is mounted for limited sliding movement in a horizontal plane. The latch member is constantly urged to the left, as viewed in Figs. 6 and 7, by compression springs 104 and 105 mounted in guide recesses in the body member 102, and is forced in the opposite direction by fluid pressure.

A pair of parallel cylinder bores 106 and 107 are formed in the left-hand side of the body member, in which a pair of plungers 108 and 109 are slidable. The plungers are secured to the adjacent side of the latch member 103 by cap screws 110 and 111, and are sealed to the cylinder bores by cup washers 112 and 113. The cylinders 106 and 107 communicate respectively with the fluid supply conduits 28 and 27 (Fig. 6) through conduits 114 and 115. Inasmuch as one or the other of the conduits 27 and 28 is connected to the source of pressure fluid to either raise or lower the slip mechanism, it will be apparent that the latch member will be retained in its right-hand position shown in Figs. 7 and 8 as long as pressure fluid is supplied to the actuating cylinder at a pressure high enough to overcome the combined force of the springs 104, 105. The spring force may be varied by suitable adjustment of the abutment screws 116, 117 against which the springs seat. These screws have threaded engagement with the body member 102 and are locked in adjusted position by lock nuts 118, 119.

A housing member 120 is fitted over the body member 102 to enclose the top and sides of the latch member 103. Laterally extending flanges 121 are formed on the housing member to provide for securing it and also the body member 102 to the plate 6, as by cap screws 122. As shown in Fig. 8, the body member 102 and housing member 120 are provided with interlocking shoulders at 123 and 124 whereby the body member is constrained against movement relative to the housing member in the direction of movement of the latch member 103.

It will be observed by reference to Fig. 8 that the housing member 120, body member 102 and plate 6 are provided with vertically aligned bores 125, 126 and 127, respectively, through which the rod 88 extends. In this form of the invention a sleeve 128 is fitted over the rod 88 and is connected thereto for axial adjustment on the rod. As shown, the upper end of the sleeve is secured, as by welding, to a nut 129 threaded on the rod. A lock nut 130 secures the sleeve in adjusted position. The sleeve 128 terminates at its lower end a short distance above the stop nut 89 on the lower end of the rod 88, thus providing a downwardly facing shoulder 131 which is adapted to engage the upper surface of the latch member 103 when the latter is in latching position.

Referring to Fig. 7, it will be noted that the latch member 103 is provided with a relatively large circular opening 132 extending vertically therethrough, which is preferably of the same diameter as the bores 125 and 126 and is disposed concentric with the latter when the latch member is in its released position, as shown in the drawing. This opening provides clearance for unobstructed passage of the sleeve 128 therethrough. A smaller opening 133 is also provided in the latch member, offset from the opening 132. The opening 133 is of approximately the diameter of the rod 88 but smaller than the sleeve 128, and hence when the latch member is moved to the left to dispose the opening 133 concentric with the rod 88, the shoulder 131 on the lower end of the sleeve 128 will overlie the latch member and will be prevented from passing therethrough. It will be understood, of course, that the rod and sleeve must be raised to dispose the shoulder 131 above the latch member before the latter can be moved into latching position. When the slip mechanism is in raised position, as determined by engagement of the stop nut 89 with the under surface of the plate 6, the shoulder 131 is at approximately the position indicated by dotted line at 135, Fig. 8. Ample clearance is thus provided between the raised position of the shoulder and the upper surface of the latch member, in order to afford sufficient time for the latch member to move into latching position before the shoulder 131 descends to latching position.

It will be apparent that by subjecting the latch member, through the intermediacy of one or the other of the plungers 108, 109, to fluid pressure from either supply line 27 or 28, the latch member will be retained in its inactive position as long as the supply of pressure fluid is maintained at or near the desired working pressure. The pressure fluid is admitted alternately to the supply lines 27 and 28 under the control of a four-way valve, so that as the pressure is cut off from one line it is simultaneously admitted to the other line. If, however, while the slips are in raised position the supply line should break, or the pressure should drop due to breakdown of the pump or compressor or for any other reason, the springs 116, 117 will move the latch member to the left to dispose the small opening 133 therein into a position concentric with the rod 88. The descent of the slip mechanism will thus be interrupted by engagement of the shoulder 131 on the sleeve 128 with the upper surface of the latch member.

In this embodiment of the invention I have also shown resilient bumpers in the form of discs 138 and 139 of rubber, neoprene or the like, loosely surrounding the rod 88 above and below the plate 6 and safety latch 101. When the slips are raised, their upward travel is quite rapid at the end of the stroke, and the metal-to-metal impact of the stop nut 89 with the under side of the plate 6 would be severe were it not for the cushioning effect of the resilient disc 139 interposed between those elements. When lowering the slips, after the slips have seated in the master bushing bowl the downward force exerted by the pressure fluid causes the arm 40, swivel base 14 and associated parts to tend to descend further, exerting a strain on the arm 40. This condition is alleviated by providing the resilient disc 138 above the safety latch and by adjusting the nut 129 on the rod 88 so that the nut engages the disc at the same time that the slips assume their set position. The resilience of the disc opposes the downward force exerted by the pressure fluid and thus relieves the arm 40 and related parts of unnecessary strain.

Referring to Figs. 9 and 11, means are provided for temporarily securing the segment 67 of the slip-carrier ring 59 to the corresponding section 55 of the supporting ring when the rings are opened up to apply the device to the pipe or remove it therefrom. An inverted U-shaped locking member 140 has one leg 141 thereof permanently mounted in a bore 142 in the arm 40, the other leg 143 being adapted to be inserted either in a bore 144 in the ring segment 67 or in a bore 145 in the arm 40 when the locking member is not in use. The leg 141 extends downwardly below the arm 40 and is provided with a washer 139 at its lower extremity to limit its upward retraction to that necessary to shift the leg 143 from the bore 144 to the bore 145. When the ring segment 67 is thus locked to the ring section 55 and arm 40, the pivot lugs thereon are in position to be aligned with the corresponding pivot lugs on the mating ring segment 68 when the pivoted ring section 56 is swung to closed position.

Inasmuch as the slip-carrier ring segment 68 is completely detached from its mating segment 67 when the supporting ring section 56 is swung to open position, and is supported only by the single roller carried by the ring section 56, it is necessary to provide other means for temporarily securing it to the ring section 56. A simple and inexpensive means for this purpose is shown in Figs. 9 and 10, and comprises a U-shaped clamp 146 adapted to embrace the ring section 56 and ring segment 68 and to be secured to the latter by a pin 147 received in a bore in the segment 68. The clamp comprises a single continuous rod bent to provide a pair of diverging upper arm portions 148 and 149 forming an eye at their juncture for the reception of the pin 147, their outer ends being bent downwardly to form vertical legs 150 extending downwardly along the outer surface of the ring section 56, and then bent inwardly to provide lower horizontal arms 151 and 152 underlying the ring section 56 and ring segment 68 to support the latter. A pair of hand grips 153, 154 may be secured by welding to the legs 150 to facilitate handling the clamp.

It will be understood that while the device is in use the locking member 140 is in its inactive position with the leg 143 inserted in the bore 145, and the clamp 146 is detached from the ring sections 56 and 68. When the device is to be removed from around the string of pipe the locking member is shifted to its locking position in engagement with the bore 144 in the ring segment 67, and the clamp 146 is applied to the ring section 56 and ring segment 68 and locked to the segment 68 by the pin 147. The retaining pins 69 and 70, holding the segments 67 and 68 together, and the latch pin 58 are then removed and the ring section 56 is swung outwardly about its pivot pin 57, carrying the ring segment 68 with it. After releasing the latch 41, the arm 40 and the rings and slips carried thereby may then be pivoted upwardly about the arm pivot 39 by connecting the catline to the eyes 48 (Fig. 2), and when so raised the parts may be swung horizontally about the vertical swivel pin 37 (Fig. 3) into an inactive position alongside the rotary table.

It will be apparent from the foregoing description of one embodiment of the invention and a modification thereof that it possesses the practical advantages of simplicity, ruggedness and dependability under the severe operating conditions to which a device of this type is subjected. The mounting of the device independently of the rotary table renders it universally adaptable to all makes and sizes of rotary tables. By providing an opening in the carrier ring 59 at least as large as the opening through the master bushing, and by providing for sufficient set-back of the slips to clear those openings, it is possible to handle pipe of any size up to the maximum size which can be run through and supported in a standard master bushing. The quick-detachable connection between the carrier ring 59 and the slip reins 78 reduces to a minimum the time required to change to different sized slips. The mounting of the arm 40 for vertical pivotal movement and horizontal swiveling with respect to the base 14 provides a simple arrangement for moving the arm and the parts supported thereby into an inoperative position wholly clear of the rotary table. The power cylinder and plunger are equally adaptable to operation by compressed air, liquid or steam. Other advantages inherent in the device will be apparent to those familiar with deep well drilling operation.

This application is a continuation-in-part of my copending application Serial No. 624,371, filed October 25, 1945, now abandoned.

Although there has been described a specific embodiment of the invention, it is to be understood that various modifications may be made therein without departing from the spirit of the invention or the scope of the appended claims.

I claim:

1. In a device of the character described, the combination of: a sectional supporting ring comprising pivotally interconnected sections; means for supporting said ring; a segmental slip-carrier ring rotatably supported by said supporting ring and comprising segments detachable from each other; pipe slips carried by said slip-carrier ring; and means for releasably securing each carrier ring segment to a corresponding supporting ring section.

2. A device as set forth in claim 1, wherein one of said securing means comprises a locking member mounted on a supporting ring section and movable into and out of interlocking engagement with a slip-carrier ring segment.

3. A device as set forth in claim 1, wherein one of said securing means comprises a substantially U-shaped clamp member removably supported by a supporting ring section and having supporting engagement with a corresponding slip-carrier ring segment.

4. In a device for actuating well pipe slips, the combination of: a slip carrier ring; a plurality of pipe slips; a link pivotally interconnecting each of said slips with said ring and including means providing a permanent pivotal connection between one end of each link and its respective slip and means providing a quick-detachable pivotal connection between the other end of each link and said ring; each quick-detachable connection comprising: a pair of spaced pivot lugs on said ring having aligned bores and a radially extending slot in each lug, said slot being of less width than the diameter of the lug bore, each link having a pivot pin integral therewith and having a major transverse dimension fitting said lug bore and a minor transverse dimension less than the width of said slot, whereby the pivot pin may be inserted into and removed from the lug bore through said slot.

5. A device for actuating well pipe slips comprising: a substantially horizontally extending arm, said arm being adapted to support said pipe slips adjacent its one end, said arm having at its other end a supporting connection to a vertically reciprocable actuator whereby the arm may be raised and lowered while being maintained substantially horizontal, said supporting connection including a pivotal connection between said arm and said actuator to permit vertical pivotal movement of said arm relative to said actuator; and releasable lock means for holding said arm in its substantially horizontal position.

6. A device for actuating well pipe slips comprising: a substantially horizontally extending arm, said arm being adapted to support said pipe slips adjacent its one end, said arm having at its other end a supporting connection to a vertically reciprocable actuator whereby the arm may be raised and lowered while being maintained substantially horizontal, said supporting connection including a pivotal connection between said arm and said actuator to permit vertical pivotal movement of said arm relative to said actuator, said arm being also mounted for horizontal pivotal movement about a vertical axis and releasable lock means for holding said arm in its substantially horizontal position and against horizontal pivotal movement.

7. A device for actuating well pipe slips comprising: a fluid-actuated cylinder and piston adapted to be mounted for relative movement in upright position adjacent a slip-supporting bowl member; an arm connected adjacent one end thereof to the movable element of said cylinder and piston whereby to be moved upwardly or downwardly thereby, said arm extending substantially horizontally from said cylinder and piston and having its other end adapted to carry said pipe slips normally disposed above said bowl member; a supporting connection mounting said arm on said movable element for vertical pivotal movement relative thereto; and releasable lock means for holding said arm in its substantially horizontal position whereby reciprocation of said movable element moves said slips into and out of engagement with said bowl member.

8. A device as set forth in claim 5, wherein said releasable lock includes: a safety element adapted to fracture and release said lock when said arm is subjected to a predetermined load greater than normal but less than that which would damage other elements of said device.

9. A device as set forth in claim 5 wherein said lock comprises: a latch member and cooperating latch pin, one mounted on said arm and the other mounted on said actuator, said latch pin being of such size and strength as to fail and thereby permit pivotal movement of said arm relative to said actuator when said arm is subjected to a predetermined load greater than normal but less than that which would damage other elements of said device.

10. A device as set forth in claim 6 wherein said lock comprises: a latch member and a cooperating latch element, one mounted on said arm and the other mounted on said actuator, said latch member and latch element cooperating to prevent vertical pivotal movement of said arm relative to said actuator, the member carrying said latch element having opposed surfaces and said latch member having surfaces thereon engageable with said opposed surfaces on the member on which said latch element is mounted to prevent horizontal swinging movement of said arm relative to said reciprocal means.

GIRD E. MULLINIX.

REFERENCES CITED

The following references are of record in the file of this patent:

UNITED STATES PATENTS

| Number | Name | Date |
|---|---|---|
| 1,341,702 | Black | June 1, 1920 |
| 1,543,904 | Carr | June 30, 1925 |
| 1,548,559 | Simpson | Aug. 4, 1925 |
| 1,656,864 | Martin | Jan. 17, 1928 |
| 1,678,307 | Stone | July 24, 1928 |
| 1,685,284 | Harding | Sept. 25, 1928 |
| 1,860,062 | Taylor | May 24, 1932 |
| 1,878,372 | Box | Sept. 20, 1932 |
| 1,924,436 | Johnsen | Aug. 29, 1933 |
| 1,945,876 | Young | Feb. 6, 1934 |
| 1,999,519 | Standlee | Apr. 30, 1935 |
| 2,076,042 | Penick et al. | Apr. 6, 1937 |
| 2,090,854 | Timbs | Aug. 24, 1937 |
| 2,109,546 | McLagan | Mar. 1, 1938 |
| 2,151,208 | Hiniker | Mar. 21, 1939 |
| 2,231,923 | Koen | Feb. 18, 1941 |
| 2,340,597 | Kelley | Feb. 1, 1944 |